Aug. 18, 1936.  J. A. GREENWOOD  2,051,208
PHOTOMETER
Filed Aug. 26, 1935
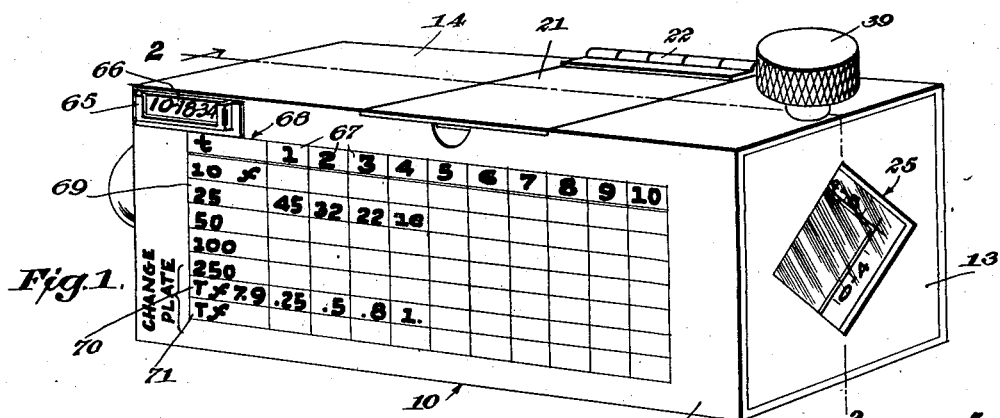
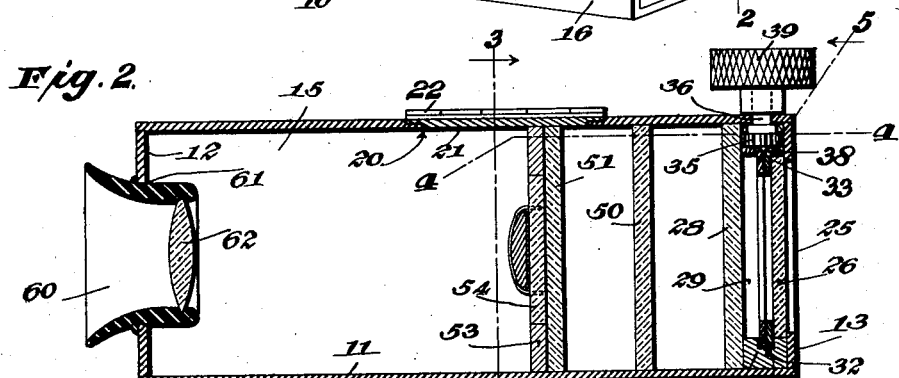
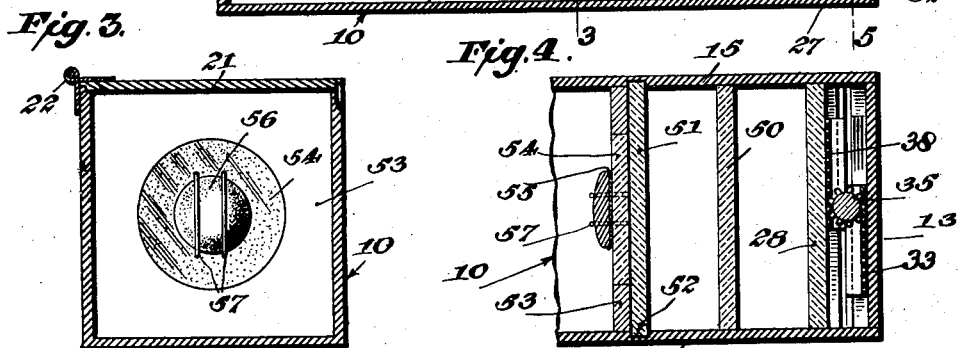
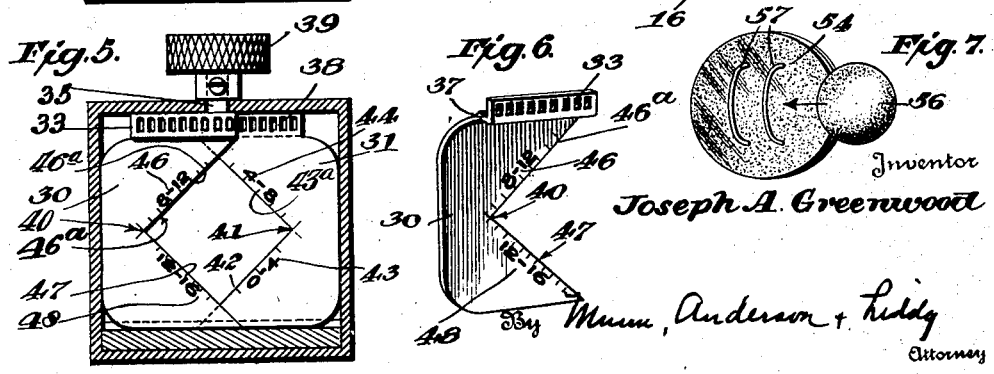
Inventor
Joseph A. Greenwood
By Munn, Anderson & Liddy
Attorney Patented Aug. 18, 1936

2,051,208

UNITED STATES PATENT OFFICE 2,051,208

PHOTOMETER

Joseph A. Greenwood, Durham, N. C.

Application August 26, 1935, Serial No. 37,992

4 Claims. (Cl. 88—23)

This invention relates to photometers.

An object of the invention is the provision of a device which may be used independently of a camera or may be employed in the camera for determining the value of the light entering the camera from an object by a comparison with a source of illumination whose value is known.

Another object of the invention is the provision of a device for comparing an unknown source of light with a known fixed source so that it is possible by such comparison to determine in advance the proper timing of the operation of a diaphragm of a camera and also the proper area of the light opening of the camera as controlled by the movement of the elements composing the diaphragm.

A further object of the invention is the provision of a device for comparing an unknown source of light with a known fixed source such as the constant source of light produced by a highly luminescent radium compound, the compound being disposed in close association with a ground glass plate having substantially the same color as the luminescent compound with the unknown source of light passing t' rough the ground glass, an opening through which the unknown source of light passes being enlarged or decreased in area until the colored ground glass discloses substantially the same luminosity as the glowing radium compound.

A still further object of the invention is the provision of a device having an opening through which an unknown source of light passes with means for controlling the enlargement of the opening until a colored ground glass in close association with a radium compound of known light intensity corresponds in luminosity to that of the radium compound, the diaphragm controlling the opening in the device being provided with scales indicating the periods of time that the radium compound has been in use with the scales being constructively associated with a cable within convenient reach of the operator so that it is possible to determine the time for the exposure for producing a photograph and the area of the opening of the diaphragm of the camera for that particular timing of the opening of the diaphragm.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in perspective of a photometer constructed in accordance with the principles of my invention, Figure 2 is a longitudinal vertical section taken along the line 2—2 of Figure 1, Figure 3 is a transverse sectional view taken along the line 3—3 of Figure 2, Figure 4 is a fragmentary horizontal section taken along the line 4—4 of Figure 2, Figure 5 is a transverse vertical section taken along the line 5—5 of Figure 2, Figure 6 is a view in perspective of one element of a diaphragm, and Figure 7 is a view in perspective of a holder for a casing for radiating compound showing the casing displaced from the holder.

Referring more particularly to the drawing, 10 designates generally a housing having a bottom 11, end walls 12 and 13, a top 14 and side walls 15 and 16.

Intermediate the ends of the top 14 there is provided an opening 20 which gives access to the interior of the housing at this point. This opening is closed by a door 21 hinged at 22 to the side wall 15. This door is neatly fitted in the opening to exclude light from the interior of the housing 10.

The end wall 13 is provided with an opening 25 which is covered by a clear glass plate 26 to exclude dust or other foreign matter from the interior of the housing. The plate 26 is secured in position in any approved manner and normally rests upon a block 27 secured to the bottom 11 of the housing.

A ground glass 28 is spaced from the glass 26 and has its lower outer face in engagement with the block 27. This ground glass is secured in position in any approved manner and cooperates with the plate 26 to provide a closed chamber 29 at the forward end of the housing.

A pair of slidably mounted plates 30 and 31 are located in this chamber and are formed of opaque material. The inner ends of these plates fit in close association with each other and have their lower ends mounted in a groove 32 in the block 27.

The plate 30 is provided with a rack 33 and this rack is adapted to be engaged by a gear 35 secured to a shaft 36. The rack 33 is offset from the plane of the member 30 by a flange 37 disposed in a horizontal plane. The member 31 is also provided with a rack 38 which is adapted to be engaged by the gear 35 and these racks overlap in spaced relation so that they will always be in engagement with the gear 35 whereby when the shaft 36 is rotated by the knob 39 these racks will be moved towards or away from each other for moving the members 30 and 31 towards or away from each other.

The member 30 is provided with a V-shaped notch or opening 40 at its inner edge while the member 31 is provided with a V-shaped notch or opening 41 at its inner edge and these V-shaped openings move towards or away from each other when the members 30, 31 are moved, and since the side edges of these openings on each plate are at right angles to each other the openings through which the light is transmitted in this diaphragm will always be rectangular or more particularly in the form of a square with the sides of the opening always equal to each other and this is true regardless of the fact of whether the opening has been increased or decreased in area.

The V-shaped opening 41 of the member 31 is provided along its edge 42 with a scale 43 and this scale is divided into a number of graduations. The adjacent edge 43a of the same opening 41 is provided with a scale 44 which is divided into a plurality of graduations. The V-shaped opening 40 has one edge 46a divided into a plurality of graduations, as shown at 46, while the adjacent edge 47 is divided into a plurality of graduations as shown at 48. The numerals 0 to 16 on these scales refer to four series of periods and represent months elapsed since the insertion of the radium compound button, as will be presently explained. The ground glass 50 is secured within the housing 10 in spaced parallel relation with the ground glass 28.

A third ground glass 51 is slidably mounted in grooves 52 formed in the side walls 15 and 16 of the housing 10 so that the ground glass may be removed when desired and for the purpose which will be presently explained. In order to remove this ground glass the door 21 must be raised for the purpose.

A holder 53 in the form of a plate is removably positioned within the housing 10 and in close association with the ground glass 51. The central portion of the plate 53 is provided with a ground glass of a particular color as shown at 54. The ground glass 54 is in the same plane with the plate 53 and it is in line with the opening provided by the diaphragm at the front end of the housing so that it will be affected by the light from an object. The value of this light from the object is unknown and is to be determined.

An opaque disc 55 is secured to the central portion of the ground glass 53 and is adapted to shield a luminescent radium compound enclosed within a transparent casing 56 from the light which enters the opening in the diaphragm. The casing 56, as shown more particularly in Figs. 2, 4, and 7, is secured to the ground glass disc 54 by means of wire loops 57 carried by the disc 54.

An eye piece 60 is mounted in an opening 61 in the rear wall 12 of the housing 10 and has its outer end preferably in the shape of an oval so that it will neatly fit the eye of the operator and prevent light at that point from affecting the interior of the housing. A lens 62 is mounted at the inner end of the eye piece and has its focal point approximately at the casing 56.

Since the luminescent radium compound progressively loses its light-giving power all deductions which are made for determining the value of the unknown source of light must be revised in accordance with the age of the radium compound and in order to do this it is necessary for the operator to have before him the date on which the compound was first used or purchased. For this purpose a tag holder, shown at 65 is secured to the side walls 16 and is adapted to receive a card 66 on which is placed the date of the purchase or the placement of the radium compound in the housing 10.

Permanent indicia is applied to the outer face of the side wall 16 of the housing and includes in the first horizontal column the numerals one to ten, inclusive of an arbitrary scale, or these numerals may be increased as may be necessary. It will be noted that each one of the numerals in the horizontal row is at the upper end of one of a plurality of vertical columns generally designated by the numeral 67. The numerals one to three, etc., in a horizontal row 68 represent the divisions of the arbitrary scales that have been placed on the edges of the diaphragm and designated by the numerals 43 to 47 inclusive. The first vertical column, shown at 69, has a plurality of numerals at one end of a corresponding horizontal row. The numerals in this first column indicate the fractions of the second for the exposures during snapshots, except the last two figures. The numerals in the vertical columns 67, and which are in corresponding rows with certain numerals in the first vertical column 69 represent the degree of openings of the diaphragm of the camera in accordance with the time elapsed from the date shown on the card 66.

In the horizontal columns, indicated by the numerals 70 and 71, are placed indicia for time exposures and the corresponding diaphragm openings for the various periods after the time indicated on the card 66.

When the operator desires to take a photograph he places the member 60 in enclosing relation with his eye and operates the knob 39 for opening the diaphragm at the forward end of the housing 10 and the opening 25 is directed towards the object to be photographed. Light coming from the object will pass through the plates 26, 28, 50, 51 and the disc 54. The transmitted light through the disc 54 may have a greater or less value than the light from the casing 56. Whatever the case may be, however, the knob 39 is adjusted until the disc 54 shows approximately the same intensity of light as the radium compound in the casing 56.

When time exposures are taken it may be necessary to replace the plate 51 by the plate which is less opaque and this can be done readily by raising the door 21 and removing the plate 51 from the grooves 52.

The scales on the diaphragm members 30 and 31 indicate the age limits of the radium compound and it will be noted that there are four differently calibrated scales which effectively quadruple the usefulness or longevity of the radium compound in the casing 56. When the radium compound has been sufficiently dissipated it is discarded and a new casing with a fresh compound is placed upon the disc 54 and supported by the holder 57.

Upon looking through the eye piece 60 with the instrument pointed at the object to be photographed the micrometer screw 39 is turned and the opening of the diaphragm members 31 and 30 is such that the field of light from the object blends with the luminescent source in the casing 56. Upon the proper one of the four scales 43, 44, 46, and 47 as determined by the time elapsed from the date on the card 66, the nearest number of marks on the edge of the square are counted. On the table shown on the side wall 16 the number from the scales previously mentioned is found in the first row 68 and this may be three. Following down the third column we come to the horizontal row marked 69 and we find the numeral twenty-two which gives the opening in the diaphragm while the numeral twenty-five in the first vertical row gives the fraction of a second for the snapshot exposed.

The number to be selected in the horizontal row 68 is found on one of the scales 43 to 47 inclusive by observing the point on one scale where it is cut by the overlapping edge of another scale. In other words where the time elapsed is between 4 and 8 months the scale 44 is used and the numeral selected in the horizontal row 68 is determined on the scale 44 where the edge 46a cuts the scale 44.

The scales 43 to 47 inclusive are determined in advance and experimentally in the laboratory The series of numerals 0–4, 4–8, 8–12, and 12–16 serve the purpose of identifying the scales to be used in accordance with the time elapsed since the application of the radium compound. The scales, however, as indicated by the line-markings and numerals as cut by a sliding edge of a section of the diaphragm select or determine which one of the columns 67 is to be employed to give the arbitrary numerical value of the diaphragm opening. The numeral in a horizontal column 68 selected by the column 67 and the first vertical column gives the corresponding speed for snapshots.

The scales 43 to 47 inclusive are divided in accordance with experimental computations and therefore there will be variations, between the units on the different scales. If for a given stop-opening and length of exposure one of the unit markings is known, all the other markings on that scale may be accurately determined.

In taking time exposures the length of exposure is important. In rows 70 and 71 two stop-opening selections are illustrated with their corresponding times for exposure. Thus if on scale 47 three marks are shown while using the time exposure plate 51, then with opening f7.9, the film should be exposed eight-tenths of a second. It is noted that the number of marks read on the correct one of the four scales 43 to 47 inclusive determines which of the columns is to be used. The operator has a choice of any one of the numbers in that column. All the combinations in the column 67 particularly in the snap-shot group admit the same total amount of light.

I claim:

1. A photometer comprising a housing having a light-transmitting opening at one end and an eye piece at the opposite end in line with the opening, a luminescent radium compound disposed in line between the light-transmitting opening and the eye piece, a plate, a lens in the eye-piece and having its focal point at the compound, a translucent disc disposed centrally of the plate and in contact with the compound, an opaque shield between the compound and the disc, means for removably securing the shield and compound on the disc, a ground glass plate slidably mounted in the casing and in contact with the first-mentioned plate, and means for controlling the quantity of light to be transmitted through the disc so that the color of the disc and the compound will be approximately the same.

2. A photometer comprising a housing having a light-transmitting opening and a sight opening in line with each other, a luminescent means between the openings, a translucent disc forming a background at the luminescent means, means between the disc and light-transmitting opening for diffusing the light rays passing from the light-transmitting opening to the disc, a diaphragm for controlling the quantity of light admitted through the light-transmitting opening so that the disc through which light is transmitted will have the same light value as the luminescent means, the diaphragm including members movable relative to each other, said members having V-shaped notches and each edge of the notches being provided with a section of a scale having graduations representing periods of time that the luminescent means has been in use, corresponding edges of the notches moving with respect to each other when said diaphragm members are moved over each other to vary the light opening, one of the V-notch edges denoting on the scale of another V-notch edge a graduation which determines the data to be selected from indicia on the housing for determining the diaphragm opening of a camera and the time exposure for a film.

3. A photometer comprising a housing having a light transmitting opening and a sight opening in line with each other, the housing being provided with a door intermediate the ends thereof, a plate mounted in the housing adjacent the door having a centrally disposed translucent disc, a luminescent means removably supported centrally of the disc, a mask between the luminescent means and the disc, a second plate in contact with the first plate for diffusing light from the light transmitting opening, means for slidably mounting the second plate in the housing adjacent the door so that said plate may be removed from the housing, and means for controlling the quantity of light admitted through the light-transmitting opening so that the disc through which light is transmitted through the second plate and the disc will have approximately the same light value as the luminescent means.

4. A photometer comprising a housing having a light-transmitting opening and a sight opening in alignment, a constantly diminishing source of light between the two openings, a diaphragm at the light-transmitting opening composed of a pair of movable members having V-shaped notches at the inner adjacent edges, each of the overlapping edges having a section of a scale, the sections being composed of graduations representing periods of time that the source of light has been in use, the overlapping edges being movable over each other to provide a square opening of an area that the light admitted through the first opening will have the approximate value of the source of light which has diminished in proportion to the time period it has been used, the section of the scale representing such time period being cut by a cooperating sliding edge and indicating a graduation which corresponds to a compensating scale on the housing representing the diaphragm opening of a camera and time exposure for a film for that particular light value.

JOSEPH A. GREENWOOD.